(12) United States Patent
Kim et al.

(10) Patent No.: US 9,898,265 B2
(45) Date of Patent: Feb. 20, 2018

(54) APPARATUS FOR SITUATIONAL COGNITION AND POSITION DETERMINATION OF SCREEN OBJECT IN PROGRAM DEVELOPMENT, AND METHOD THEREFOR

(71) Applicant: Inswave Systems Co., Ltd., Seoul (KR)

(72) Inventors: Wooglae Kim, Seoul (KR); Hyunchul An, Seoul (KR)

(73) Assignee: INSWAVE SYSTEMS CO., LTD., Seoul (KR)

( * ) Notice: Subject to any disclaimer, the term of this patent is extended or adjusted under 35 U.S.C. 154(b) by 39 days.

(21) Appl. No.: 14/648,619

(22) PCT Filed: Apr. 18, 2013

(86) PCT No.: PCT/KR2013/003270
§ 371 (c)(1),
(2) Date: May 29, 2015

(87) PCT Pub. No.: WO2014/084462
PCT Pub. Date: Jun. 5, 2014

(65) Prior Publication Data
US 2015/0309775 A1    Oct. 29, 2015

(30) Foreign Application Priority Data
Nov. 30, 2012    (KR) ........................ 10-2012-0137904

(51) Int. Cl.
*G06F 9/44* (2006.01)
*G06F 3/0481* (2013.01)

(52) U.S. Cl.
CPC .............. *G06F 8/38* (2013.01); *G06F 3/0481* (2013.01); *G06F 9/4443* (2013.01)

(58) Field of Classification Search
CPC ..... G06F 8/38; G06F 9/06; G06F 9/44; G06F 3/048; G06F 3/0481; G06F 3/13;
(Continued)

(56) References Cited

U.S. PATENT DOCUMENTS 5,673,401 A * 9/1997 Volk .................... G06F 3/04847
348/E5.103
6,941,521 B2 * 9/2005 Lin .......................... G06F 8/38
715/762

(Continued)

FOREIGN PATENT DOCUMENTS

KR         100287061         4/2001
KR        1020110049275      5/2011
(Continued)

*Primary Examiner* — Emerson C Puente
*Assistant Examiner* — Erika A Kretzmer
(74) *Attorney, Agent, or Firm* — IP & T Group LLP

(57) ABSTRACT

A screen object positioning device and a screen object positioning method in program development are provided. The screen object positioning device includes: a parent object generating unit configured to generate a parent object having predetermined first object position information; a first child object generating unit configured to generate a first child object which is placed on the parent object and which has second object position information corresponding to a first positioning rule calculated using the first object position information; and a second child object generating unit configured to generate a second child object which is placed on the parent object and which has third object position information corresponding to a second positioning rule calculated using the second object position information. The screen object positioning device can position a child object placed on a parent object in consideration of a situation based on information of the parent object in program development.

13 Claims, 15 Drawing Sheets

(58) Field of Classification Search
CPC ... H04B 1/40; G06T 11/00; G06T 11/20; G06T 11/40; G06T 11/60
USPC .......... 715/762–855; 345/661, 662
See application file for complete search history.

(56) References Cited

U.S. PATENT DOCUMENTS

| | | | |
|---|---|---|---|
| 7,200,819 B2 * | 4/2007 | Bells .................. | G06T 11/00 715/765 |
| 2003/0020740 A1 * | 1/2003 | Bells .................. | G06T 11/00 715/700 |
| 2003/0184585 A1 * | 10/2003 | Lin .................... | G06F 8/38 715/763 |
| 2005/0235293 A1 * | 10/2005 | Fortes ................ | G06F 8/38 719/329 |
| 2013/0167028 A1 * | 6/2013 | Goldman ........... | H04N 21/4425 715/716 |

FOREIGN PATENT DOCUMENTS

| | | |
|---|---|---|
| KR | 1020120038827 | 4/2012 |
| KR | 101150003 | 6/2012 |

\* cited by examiner

APPARATUS FOR SITUATIONAL COGNITION AND POSITION DETERMINATION OF SCREEN OBJECT IN PROGRAM DEVELOPMENT, AND METHOD THEREFOR

This application is a national stage application of PCT/KR2013/003270 filed on Apr. 18, 2013, which claims priority of Korean patent application number 10-2012-0137904 filed on Nov. 30, 2012. The disclosure of each of the foregoing applications is incorporated herein by reference in its entirety.

TECHNICAL FIELD

The present invention relates to a screen object positioning device in consideration of a situation based on information of the screen object in program development.

BACKGROUND ART

With recent advancement in computer technology, a variety of software has been developed. Program development tools are used to develop software. In the past, developers often performed manual coding work, but in the present time, developers develop software more simply using a graphic-user interface.

In the related art, various techniques of simply producing software have been proposed. For example, Korean Patent No, 0287061 discloses a method of automatically generating an object-oriented program based on details of a language of temporal ordering specification (LOTOS), thereby enhancing productivity in software development and quality of developed software.

However, the related art do not have proposed a method capable of effectively reducing a load of development work which a program developer should necessarily perform repeatedly. As a demand for a variety of software increases, there is a more need for a technique capable of reducing a load of repeated work which is necessary for program development.

The above-mentioned related art is technical information which is thought out to make the invention or is learned by the inventor in the course of making the invention, but cannot be thus said to be technical information known to the public before filing the invention.

DISCLOSURE OF THE INVENTION

Technical Problem

An object of the present invention is to provide a device and a method of positioning a child object placed on a parent object in consideration of a situation based on information of the parent object in program development.

Other objects of the present invention will be easily understood from the following description.

Solution to Problem

According to an aspect of the present invention, there is provided a screen object positioning device in program development including: a parent object generating unit configured to generate a parent object having predetermined first object position information; a first child object generating unit configured to generate a first child object which is placed on the parent object and which has second object position information corresponding to a first positioning rule calculated using the first object position information; and a second child object generating unit configured to generate a second child object which is placed on the parent object and which has third object position information corresponding to a second positioning rule calculated using the second object position information.

Here, the first positioning rule may be a rule for generating the second object position information to be the same as the first object position information.

The second positioning rule may foe a rule for generating the third object position information to be the same as the second object position information.

The screen object positioning device may further include a rule changing unit configured to change the second positioning rule, and the third object position information of the second child object which is additionally generated after the second positioning rule is changed by the rule changing unit may be determined in accordance with the changed second positioning rule until the second positioning rule is changed again.

Here, the rule changing unit may include information selecting means for correlating one position information piece of the plurality of third object position information pieces with one position information piece of the plurality of second object position information pieces.

one or more of the first to third object position information pieces may include one or more of a static attribute in which a newly-generated object is located at an object reference point formed by an object existing in the parent object, a relative attribute in which a newly-generated object is located at a specific position relative to an object reference point formed by an object existing in the parent object, an absolute attribute in which a newly-generated object is located at a specific position relative to a screen reference point formed on a screen on which an object is displayed in the parent object, and a fixed attribute in which a newly-generated object is located at a specific position relative to a screen reference point formed on a screen on which an object is displayed in the parent object regardless of the position of the parent object.

Here, the second child object generating unit may generate the second child object to correspond to the second object position information of the first child object, which has been generated immediately before the second child object is generated, among a plurality of the first child objects.

According to another aspect of the present invention, there is provided a screen object positioning method in program development including: generating a parent object having predetermined first object position information; generating a first child object which is placed on the parent object and which has second object position information corresponding to a first positioning rule calculated using the first object position information; and generating a second child object which is placed on the parent object and which has third object position information corresponding to a second positioning rule calculated using the second object position information.

The screen object positioning method may further include changing the second positioning rule, and the third object position information of the second child object which is additionally generated after the second positioning rule is changed may be determined in accordance with the changed second positioning rule until the second positioning rule is changed again.

The changing of the second positioning rule may include correlating one position information piece of the plurality of third object position information pieces with one position information piece of the plurality of second object position information pieces.

Other aspects, features, and advantages of the invention will become apparent from the accompanying drawings, the appended claims, and the detailed description of the invention.

Advantageous Effects of the Invention

In the screen object positioning device and method according to the present invention, it is possible to position a child object placed on a parent object in consideration of information of the parent object in program development.

DESCRIPTION OF EMBODIMENTS OF THE INVENTION

Figure 1:
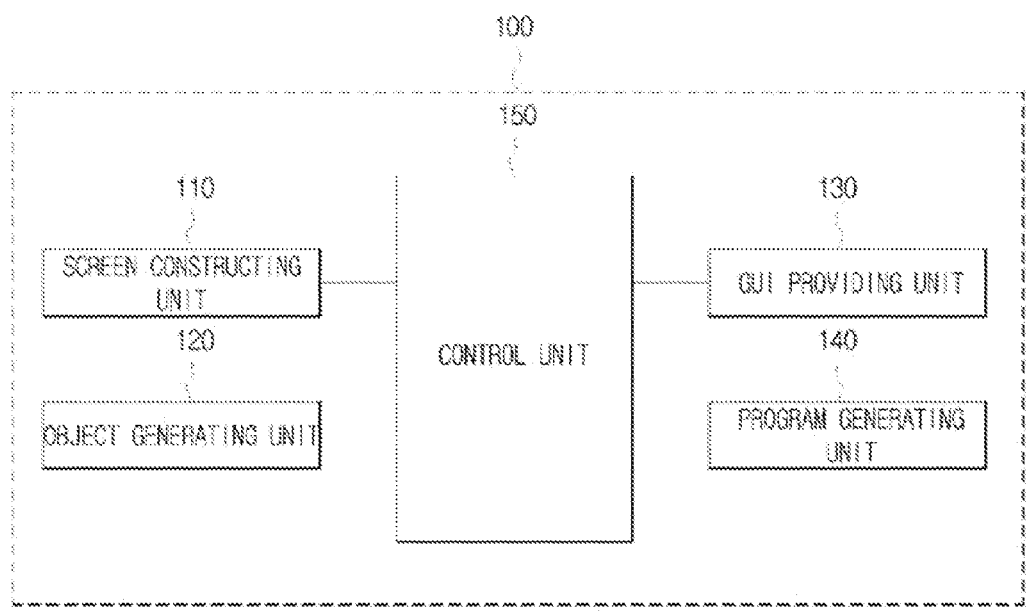
FIG. 1 is a block diagram illustrating a configuration of a program development device according to an embodiment of the present invention.

The invention can be modified in various forms and specific embodiments will be described and shown below. However, the embodiments are not intended to limit the invention, but it should be understood that the invention includes all the modifications, equivalents, and replacements belonging to the concept and the technical scope of the invention.

Terms "first", "second", and the like can be used to describe various elements, but the elements should not be limited to the terms. The terms are used only to distinguish an element from another.

If it is mentioned that an element is "connected to" or "coupled to" another element, it should be understood that still another element may be interposed therebetween, as well as that the element may be connected or coupled directly to another element.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and if should thus be understood that the possibility of existence or addition of one or more other different features, numbers, steps, operations, elements, components, or combinations thereof is not excluded.

Terms "unit", "module", and the like described in the specification mean a unit for performing at least one function or operation and can be embodied by hardware, by software, or by a combination of hardware and software.

In describing the invention with reference to the accompanying drawings, like elements are referenced by like reference numerals or signs regardless of the drawing numbers and description thereof is not repeated. When it is determined that detailed description of known techniques involved in the invention makes the gist of the invention obscure, the detailed description thereof will not be made.

FIG. 1 is a block diagram illustrating a configuration of a program development device according to an embodiment of the present invention. Referring to FIG. 1, the program development device 100 includes a screen constructing unit 110, an object generating unit 120, a GUI providing unit 130, a program generating unit 140, and a control unit ISO.

In this embodiment, a position of a subordinate object placed on a generic object is determined in consideration of a situation based on information of the generic object. That is, a program developer does not need to additionally correct position information of objects by setting a position of a subordinate object to be most suitable for a situation.

In this embodiment, an object may be a component which is placed at a specific position on a screen by graphics, such as a button, a list box, a combo box, an edit box, a grid, a scroll view, and a window, in program development. A subordinate object may be an object which is placed on a generic object and of which the position is specified. Hereinafter, a generic object is referred to as a parent object, a subordinate object is referred to as a child object, and child objects are referred to as brother objects in view of mutual relationship.

The screen constructing unit 110 constructs a screen of a program development tool which is output to a display unit in a user terminal, and can display details using a scroll when the details to be displayed are larger than the screen.

The user terminal is a general-purpose or specified-purpose computing device such as a hand-held PC, a notebook computer, a laptop computer, a pad, and a server, and may include a terminal which can perform predetermined computing operations by mounting a microprocessor capable of performing a multimedia reproducing function thereon.

The user terminal may be a terminal on which an application for providing a screen object positioning method in program development according to this embodiment or a program module having a corresponding function is basically mounted so as to be operable.

The display unit of the user terminal may be a device capable of output an image in various methods such as a liquid crystal display (LCD), an organic light emitting diode (OLED), a CRT, a 3D display, and other flexible displays.

The display unit of the user terminal according to this embodiment, may have functions such as zoom-in, zoom-out, screen movement, and scroll.

Details to be displayed on the screen of the user terminal may be data stored in the program development tool or data downloaded from the Internet by a network connector. The display unit of the user terminal may be embodied as a touch screen. In this case, a touch information processing unit may sense a touched point on the screen and process event information generated at the corresponding position.

The object generating unit 120 generates the parent object and the child objects and determines attribute information of an object to be newly added in advance using the attribute information of the objects.

The GUI providing unit 130 provides the program development tool to a user as a program developer by graphics. The program generating unit 140 generates an executable file by compiling a program developed using the generated objects and the attribute information thereof.

The control unit 150 controls the functional units such that the screen constructing unit 110, the object generating unit 120, the GUI providing unit 130, and the program generating unit 140 perform specific functions by interlocking with each other.

In the program development tool in the related art, since basic values instead of a situation awareness rule are applied, work of additionally correcting position information of objects should be repeatedly performed after the work of adding a new object. However, in this embodiment, since attributes due to a development environment are designated in advance, a part of the repeated work can be reduced in consideration of a situation, thereby enhancing work efficiency and preventing a decrease in productivity due to repeated work.

Figure 2:
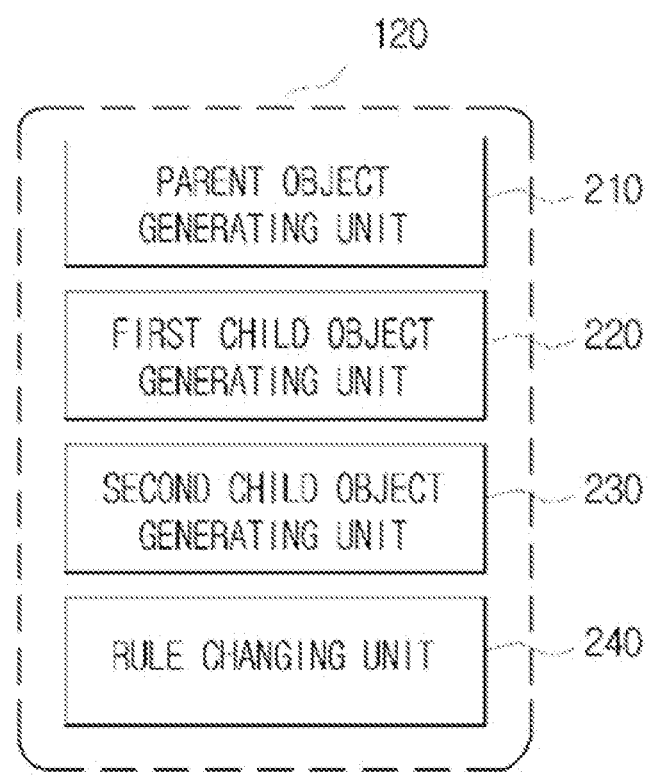
FIG. 2 is a block diagram illustrating a configuration of a screen object positioning device in program development according to an embodiment of the present invention.

FIG. 2 is a block diagram illustrating a configuration of a screen object positioning device in program development according to an embodiment of the present invention. Referring to FIG. 2, the object generating unit 120 includes a parent object generating unit 210, a first child object generating unit 220, a second child object generating unit 230, and a rule changing unit 240.

The parent object generating unit 210 generates a parent object having predetermined first object position information. A parent object may be an object which is operated in a state in which a child object to be described later is placed thereon.

For example, when a child object is dependent on one or more attributes of attributes of the parent object and one or more of the dependent attributes of the child object is changed by change of the position, size, or shape of the parent object, the child object can be said to be placed on the parent object. The first object position information may be information for locating the parent object at a specific position on the screen.

The first child object generating unit 220 generates a first child object which is placed on the parent object and which has second object position information corresponding to a first positioning rule calculated using the first object position information. Here, when the parent object moves, the first child object can also move.

For example, the second object position information may be any one of a static attribute in which a newly-generated object is located at an object reference point formed by an object existing in the parent object, a relative attribute in which a newly-generated object is located at a specific position relative to an object reference point formed by an object existing in the parent object, an absolute attribute in which a newly-generated object is located at a specific position relative to a screen reference point formed on a screen on which an object is displayed in the parent object, and a fixed attribute in which a newly-generated object is located at a specific position relative to a screen reference point formed on a screen on which an object is displayed in the parent object regardless of the position of the parent object.

The first object position information and/or third object position information to be described later may be the same as of information as the second object position information.

The first positioning rule may be a rule for generating the second object position information to be the same as the first object position information. That is, when, the parent object has the static attribute, the first child object can also have the static attribute. When the parent object has the relative attribute, the first child object can also have the relative attribute. When the parent object has the absolute attribute, the first child object can also have the absolute attribute.

The second child object generating unit 230 generates a second child object which is placed on the parent object and which has third object position information corresponding to a second positioning rule calculated using the second object position information. Here, when the parent object moves, the second child object can also move.

The second positioning rule may be a rule for generating the third object position information to be the same as the second object position information. That is, when the first child object has the static attribute, the second child object can also have the static attribute. When the first child object has the relative attribute, the second child object can also have the relative attribute. When the first child object has the absolute attribute, the second child object can also have the absolute attribute.

Here, the second positioning rule is a rule for generating the third object position information to be the same as the first object position information. In this case, the attributes of the second child object may be generated depending on the attributes of the parent object.

Here, when there are plural first child objects, the second child object generating unit 230 may generate the second child object to correspond to the second object position information of the first child object which has been generated immediately before the second child object is generated, that is, which has been generated latest.

The rule changing unit 240 changes the second positioning rule. In this case, the third object position information of the second child object which is additionally generated after the second positioning rule is changed by the rule changing unit 240 may be determined in accordance with the changed second positioning rule until the second positioning rule is changed again.

Here, the rule changing unit 240 may include information selecting means for correlating one information piece of the plurality of third object position information pieces with one position information piece of the plurality of second object position information pieces. The information selecting means may be means for selecting corresponding information using a combo box, a list box, a radio button, or a check box instead of manually inputting specific information such as text.

The rule changing unit 240 may change the first positioning rule. In this case, the second object position information of the first child object which is additionally generated after the first positioning rule is changed by the rule changing unit 240 is determined in accordance with the changed first positioning rule until the first positioning rule is changed again.

The screen object positioning device according to this embodiment may further include a storage unit (not illustrated) in which one or more object position information piece and/or one or more positioning rules are stored. The parent object generating unit 210, the first child object generating unit 220, the second child object generating unit 230, and the rule changing unit 240 may extract the information and/or rule stored in the storage unit to generate an object or may change the rule.

Figure 3:
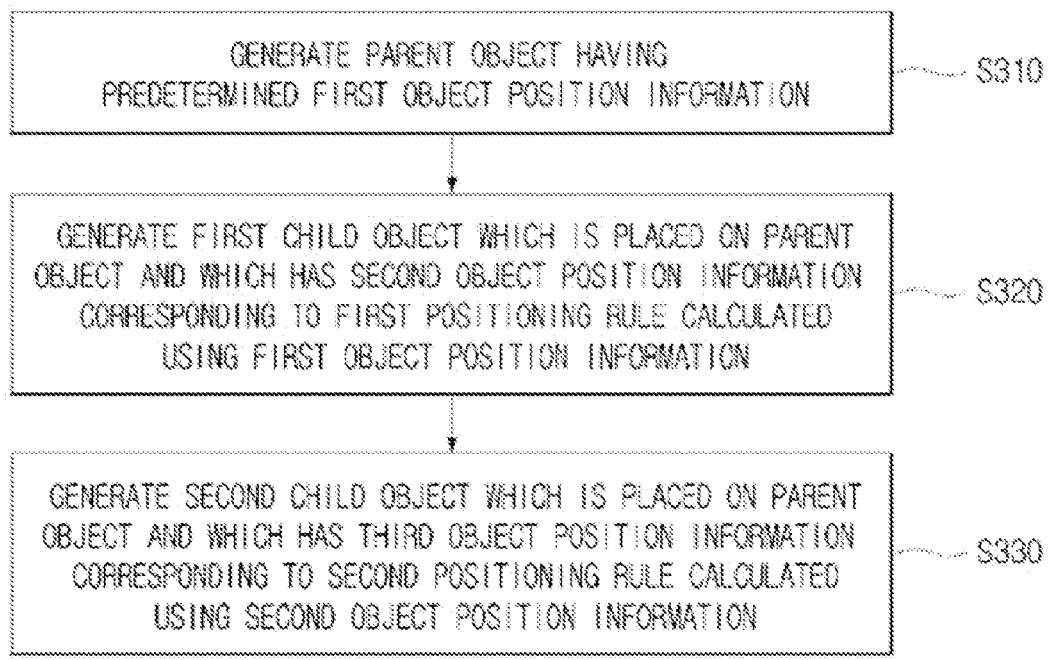
FIG. 3 is a flowchart illustrating a screen object positioning method in program development according to an embodiment of the present invention.

FIG. 3 is a flowchart illustrating a screen object positioning method in program development according to an embodiment of the present invention. The steps to be described below can be performed by the program development device 100. The steps do not have to be performed in time series. When the performance order of the steps is changed but the gist of the present invention is satisfied, this belongs to the scope of the present invention.

In step S310, a parent object having predefined first object position information is generated using a program development tool.

In step S320, a first child object is generated which is located on the parent object such that one or more attributes are dependent on the information of the parent object and which has second object position information corresponding to the first positioning rule calculated using the first object position information. The first positioning rule may be a rule for determining second object position information and the first object position information to be the same.

In step S330, a second child object is generated which is located, on the parent object so as to be affected by the first object position information of the first child object and for one or more attributes to be dependent on the information of the parent object and which has third object position information corresponding to a second positioning rule calculated using the second object position information.

According to these steps, when a program developer generates a child object, it is possible to effectively reduce the number of simple operations for designating the attributes thereof.

According to another embodiment of the present invention, there is provided a method capable of smoothly outputting a screen without any break by calculating an optimal FPS (Frame Per Second) in displaying the screen of the program development tool in which performance such as a mobile environment is low. Here, the screen may be a scroll view including a vertical or horizontal scroll.

First, a basic FPS setting unit sets a basic FPS at which the screen operates depending on the OS of the user terminal. For example, 60 Hz may be set for iOS and 60 Hz may be set for Android. The basic FPS may be a processing rate which is set such that the scroll view as a web screen operates without any break.

Thereafter, a maximum FPS measuring unit measures a maximum FPS of the user terminal and an FPS comparing unit compares the basic FPS with the maximum FPS. When the maximum FPS is equal to or greater than the basic FPS, the scroll view may operate smoothly at the basic FPS and thus a user FPS setting unit sets the basic FPS as the FPS to be used.

However, when the maximum FPS is less than the basic FPS, the operation of a scroll view at the basic FPS may be hard on the user terminal and thus the use FPS setting unit sets the maximum FPS as the FPS to be used.

The screen constructing unit 110 causes the scroll view to operate at the set FPS.

The screen object positioning device and method in program development are described above with reference to the block diagram and the flowchart. Now, specific embodiments of the screen object positioning device and method in program development according to the present invention will be specifically described with reference to the accompanying drawings. The present invention is not limited to the specific description.

Figure 4:
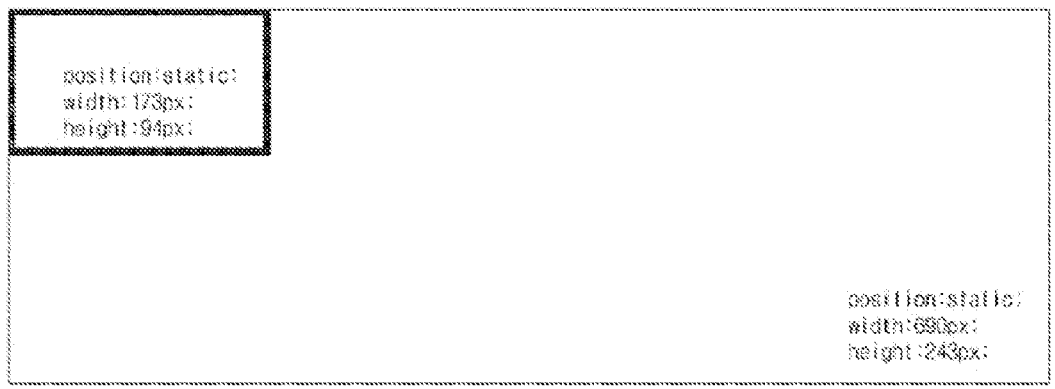
FIGS. 4 to 6 are diagrams illustrating a child object having an attribute corresponding to an attribute of a parent object, which is generated using the screen object positioning method in program development according to the embodiment of the present invention.
Figure 5:
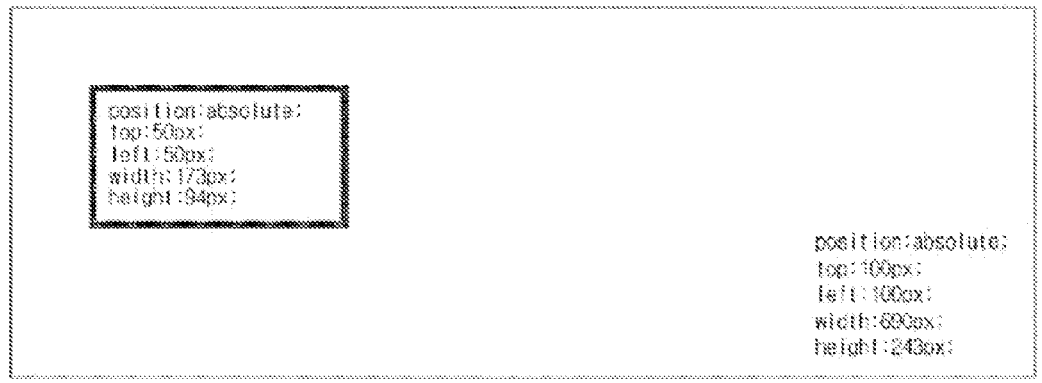
Figure 6:
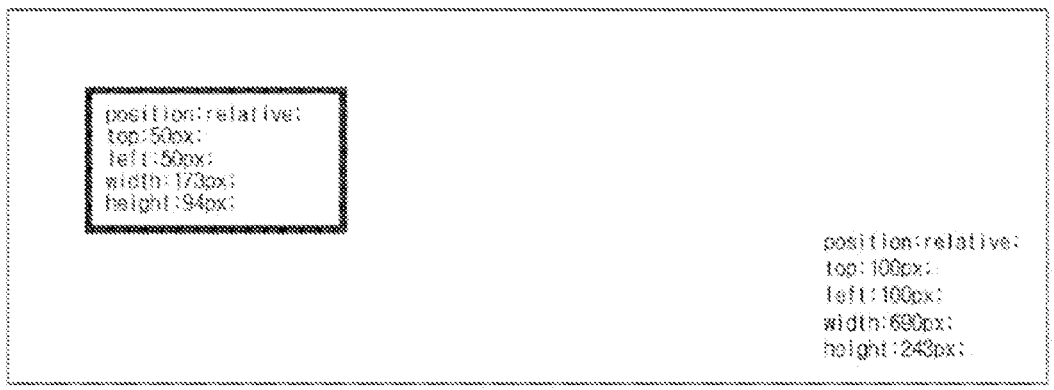

FIGS. 4 to 6 are diagrams illustrating a child object having an attribute corresponding to an attribute of a parent object, which is generated using the screen object positioning method in program development according to the embodiment of the present invention.

A frame forming the outline of the drawings is a parent object, and a rectangular box located in the parent object is a child object. The attributes of the parent object are described at the bottom-right end of the parent object, and the attributes of the child object are described in the child object. The attributes of an object may include a position, a width, and a height.

Referring to FIGS. 4 to 6, the number of child, objects located in the parent object is one. Referring to FIGS. 4 to 6, position information of the child object is generated to be the same as the position information of the parent object by the first positioning rule.

That is, when the parent object has the static attribute, the child object can also have the static attribute. When the parent object has the absolute attribute, the child object can also have the absolute attribute. When the parent object has the relative attribute, the child object can also have the relative attribute.

On the other hand, the child object may be set in advance to have attributes different from the attributes of the parent object. For example, when the parent object has any one of the static attribute, the absolute attribute, and the relative attribute, the child object may have an attribute other than the attribute of the parent object among the above-mentioned three attributes. The attribute of the child object may be determined in view of the attribute of the parent object in consideration of a program development environment, a user interface, requirements of a program consumer, convenience in program development, and the like.

FIGS. 7 to 15 are diagrams illustrating a brother object-having an attribute corresponding to an attribute of another brother object, which is generated using the screen object positioning method in program development according to the embodiment of the present invention. A dotted rectangular object in the parent object is a first child object and a bold rectangular object is a second child object. The position information of the second child object is generated to be the same as the position information of the first child object which is a brother object thereof by the second positioning rule.

Figure 7:
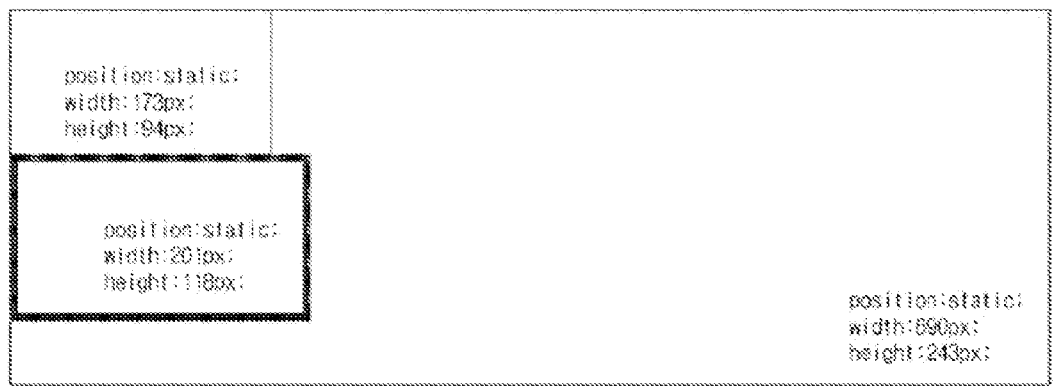
FIGS. 7 to 15 are diagrams illustrating a brother object having an attribute corresponding to an attribute of another brother object, which is generated using the screen object positioning method in program development according to the embodiment of the present invention.

Referring to FIG. 7, when the parent object has the static attribute, both the first child object and the second child object can have the static attribute.

Figure 8:

Referring to FIG. 8, when the parent object has the absolute attribute and the first child object has the static attribute, the second child object may have the static attribute depending on the attribute of the first child object.

Figure 9:

Referring to FIG. 9, when the parent object has the relative attribute and the first child object has the static attribute, the second child object may have the static attribute depending on the attribute of the first child object.

Figure 10:

Referring to FIG. 10, when the parent object has the static attribute and the first child object has the absolute attribute, the second child object may have the absolute attribute depending on the attribute of the first child object.

Figure 11:
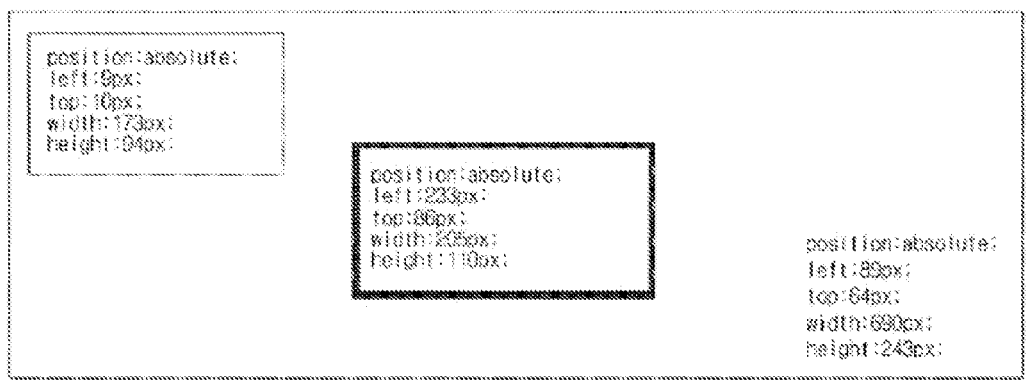

Referring to FIG. 11, when the parent object has the absolute attribute, both the first child object and the second child object can have the absolute attribute.

Figure 12:
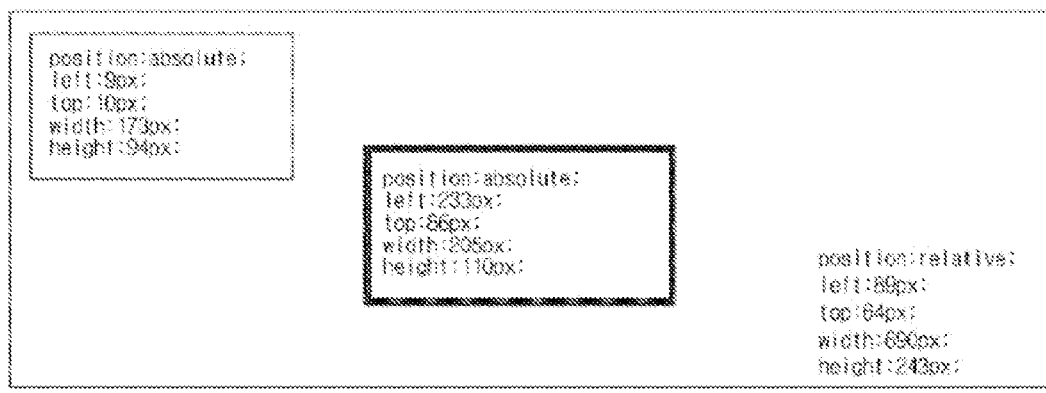

Referring to FIG. 12, when the parent object has the relative attribute and the first child object has the absolute attribute, the second child object may have the absolute attribute depending on the attribute of the first child object.

Figure 13:
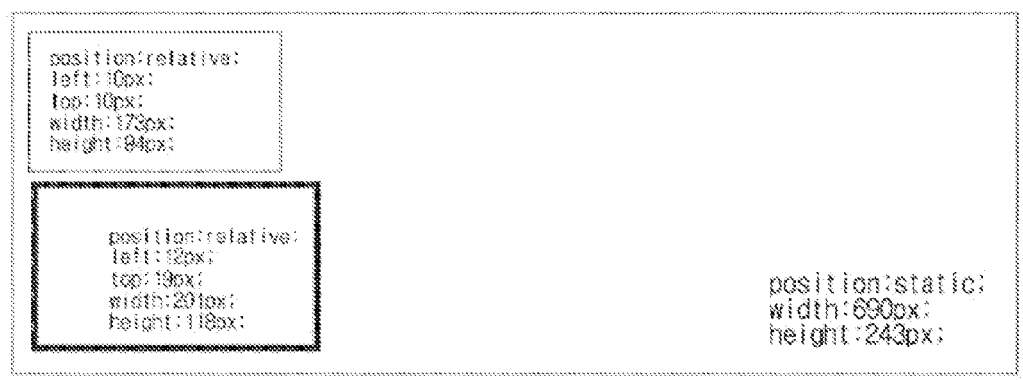

Referring to FIG. 13, when the parent object has the static attribute and the first child object has the relative attribute, the second child object may have the relative attribute depending on the attribute of the first child object.

Figure 14:
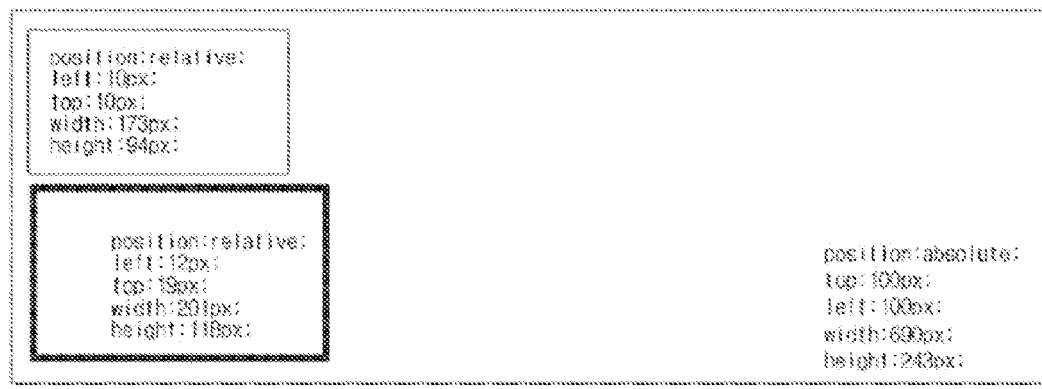

Referring to FIG. 14, when the parent object has the absolute attribute and the first child object has the relative attribute, the second child object may have the relative attribute depending on the attribute of the first child object.

Figure 15:
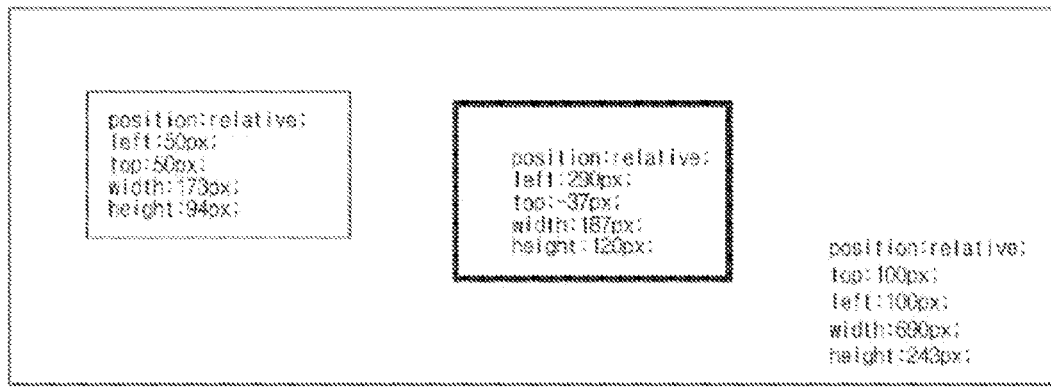

Referring to FIG. 15, when the parent object has the relative attribute, both the first child object and the second child object can have the relative attribute.

These examples illustrate a rule for generating a new object depending on the attribute of a brother object, which is temporally or distantly closest to the new object.

In this embodiment, when the attribute of the brother object which is temporally or distantly closest to the new object is the fixed attribute, the brother objects are searched in the reverse generation time order or in the close distance order for a brother object having an attribute other than the fixed attribute, and the attribute of the searched-out brother object can be set as the attribute of the new object. When there is no brother object having an attribute other than the fixed attribute, a new object can be generated to have the fixed attribute or a new object may be generated depending on the attribute of the parent object.

Specific description of a system configuration, an embedded system, a common platform technique and a communication protocol such as an O/S, and an interface standardisation technique such as an I/O interface of the screen object positioning device in program development according to the embodiments of the present invention is obvious to those skilled in the art and will not be made herein.

The screen object positioning method in program, development according to the present invention can be embodied in the form of a program, command which can be executed by various computing means and can be recorded on a computer-readable recording medium. That is, the screen object positioning method can be embodied as a computer-readable recording medium having recorded a program causing a computer to perform the above-mentioned steps.

The computer-readable recording medium may include a program command, a data file, and a data structure singly or in combination. The program command recorded on the recording medium may be particularly designed and constructed for the present invention or may be well known to and usable by those skilled in the art. Examples of the computer-readable recording medium include magnetic media such as a hard disk, a floppy disk, and a magnetic tape, optical media such as CD-ROM and DVD, magneto-optical media such as a floptical disk, and a hardware unit which is particularly constructed to store and execute a program command, such as ROM, RAM, and a flash memory.

INDUSTRIAL APPLICABILITY

The elements and/or functions described above in the embodiments can be complexly combined and embodied. It will be understood by those skilled in the art that the invention can be modified and changed in various forms without departing from the concept and scope of the invention described in the appended claims.

The invention claimed is:

1. A screen object positioning method in program development comprising:

locating on the display of the user terminal a parent object at a specific position determined by first object position information;

locating on the display of the user terminal a first child object at a relative position determined by second object position information corresponding to the first object position information; and locating on the display of the user terminal a second child object at a relative position determined by third object position information corresponding to the second object position information, wherein one or more of the first, second and third object position information includes one or more of a static attribute in which a newly-generated object is located at an object reference point formed by an object existing in the parent object, a relative attribute in which the newly-generated object is located at a specific object position relative to the object reference point formed by the object existing in the parent object, an absolute attribute in which the newly-generated object is located at a specific screen position relative to a screen reference point formed on a screen on which the object is displayed in the parent object, and a fixed attribute in which the newly-generated object is located at the specific screen position relative to the screen reference point formed on the screen on which the object is displayed in the parent object regardless of the position of the parent object, wherein brother objects are child objects having a mutual relationship with each other, wherein when the newly generated object is temporally closest to a brother object having the fixed attribute, the brother objects are searched in reverse generation time order for a third brother object having an attribute other than the fixed attribute, wherein when the third brother object is found then the attribute of the newly-generated object is set as the attribute of the third brother object, and wherein when the third brother object is not found, the attribute of the newly generated object is set as the fixed attribute or the attribute of the parent object.

2. The screen object positioning method according to claim 1, wherein the second object position information is the same as the first object position information.

3. The screen object positioning method according to claim 1, wherein the third object position information is the same as the second object position information so that when the first child object includes the static attribute the second child object includes the static attribute, when the first child object includes the relative attribute the second child object includes the relative attribute and when the first child object includes the absolute attribute the second child object includes the absolute attribute.

4. The screen object positioning method according to claim 3, further comprising changing the second object position information, wherein the third object position information of the second child object which is additionally generated after the second object position information is changed is determined in accordance with the changed second object position information until the second object position information is changed again.

5. The screen object positioning method according to claim 4, wherein the changing of the second object position information includes correlating the third object position information with the second object position information.

6. The screen object positioning method according to claim 1, wherein the generating the first child object is performed before the second child object is generated.

7. The screen object positioning method according to claim 1, further comprising:
measuring a maximum FPS rate of the user terminal;
comparing the basic FPS rate with the maximum FPS rate; and
adjusting the basic FPS to be equal to the maximum FPS rate when the maximum FPS rate is less than the basic FPS rate.

8. The screen object positioning method according to claim 1, wherein the parent object, the first child object and the second child object are one or more of a button, a list box, a combo box, an edit box, a grid, a scroll view and a window.

9. The screen object positioning method according to claim 1,
wherein the static attribute, the relative attribute and the absolute attribute each include a position, a width and a height.

10. The screen object positioning method according to claim 1, wherein placed on the parent object includes the first child object and the second child object being dependent on one or more attributes of the parent object so that one or more of the dependent attributes of the first child object and the second child object is changed by position, size or shape of the parent object.

11. The screen object positioning method according to claim 1,
wherein when the parent object has the static attribute then both the first child object and the second child object are set as the static attribute of the parent,
when the parent object has the absolute attribute and the first child object has the static attribute then the second child object is set as the static attribute,
when the parent object has the relative attribute and the first child object has the static attribute then the second child object is set as the static attribute,
when the parent object has the static attribute and the first child object has the absolute attribute then the second child object is set as the absolute attribute,
when the parent object has the absolute attribute then both the first child object and the second child object are set as the absolute attribute of the parent,
when the parent object has the relative attribute and the first child object has the absolute attribute then the second child object is set as the absolute attribute,
when the parent object has the static attribute and the first child object has the relative attribute then the second child object is set as the relative attribute,
when the parent object has the absolute attribute and the first child object has the relative attribute then the second child object is set as the relative attribute, and
when the parent object has the relative attribute then both the first child object and the second child object are set as the relative attribute.

12. A screen object positioning method in program development comprising:
locating on the display of the user terminal a parent object at a specific position determined by first object position information;
locating on the display of the user terminal a first child object at a relative position determined by second object position information corresponding to the first object position information; and
locating on the display of the user terminal a second child object at a relative position determined by third object position information corresponding to the second object position information,
wherein one or more of the first, second and third object position information includes one or more of a static attribute in which a newly-generated object is located at an object reference point formed by an object existing in the parent object, a relative attribute in which the newly-generated object is located at a specific object position relative to the object reference point formed by the object existing in the parent object, an absolute attribute in which the newly-generated object is located at a specific screen position relative to a screen reference point formed on a screen on which the object is displayed in the parent object, and a fixed attribute in which the newly-generated object is located at the specific screen position relative to the screen reference point formed on the screen on which the object is displayed in the parent object regardless of the position of the parent object,
wherein brother objects are child objects having a mutual relationship with each other,
wherein when the newly-generated object is closest in distance to a brother object having the fixed attribute, the brother objects are searched in close distance order for a third brother object having an attribute other than the fixed attribute,
wherein when the third brother object is found, then the attribute of the newly-generated object is set as the attribute of the third brother object, and
wherein when the third brother object is not found, the attribute of the newly-generated object is set as either the fixed attribute or the attribute of the parent object.

13. The screen object positioning method according to claim 12,
wherein when the parent object has the static attribute then both the first child object and the second child object are set as the static attribute of the parent,
when the parent object has the absolute attribute and the first child object has the static attribute then the second child object is set as the static attribute,
when the parent object has the relative attribute and the first child object has the static attribute then the second child object is set as the static attribute,
when the parent object has the static attribute and the first child object has the absolute attribute then the second child object is set as the absolute attribute,
when the parent object has the absolute attribute then both the first child object and the second child object are set as the absolute attribute of the parent,
when the parent object has the relative attribute and the first child object has the absolute attribute then the second child object is set as the absolute attribute,
when the parent object has the static attribute and the first child object has the relative attribute then the second child object is set as the relative attribute,
when the parent object has the absolute attribute and the first child object has the relative attribute then the second child object is set as the relative attribute, and
when the parent object has the relative attribute then both the first child object and the second child object are set as the relative attribute.

* * * * *